United States Patent
Cannon et al.

(10) Patent No.: US 6,671,252 B1
(45) Date of Patent: Dec. 30, 2003

(54) ROBUST SIGNALING TONE DURATION MEASUREMENT

(75) Inventors: Joseph M. Cannon, Harleysville, PA (US); James A. Johanson, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/285,669

(22) Filed: Apr. 5, 1999

(51) Int. Cl.[7] ................................................ H04J 11/00
(52) U.S. Cl. ....................... 370/210; 370/484; 379/283; 379/351; 379/386; 379/406.13
(58) Field of Search ......................... 370/210, 522–526, 370/484; 379/282–283, 351, 386, 1 EEE, 29.06, 406.13; 708/403, 404, 405, 821

(56) References Cited

U.S. PATENT DOCUMENTS 5,694,466 A * 12/1997 Xie et al. .................... 379/282
6,363,175 B1 * 3/2002 Scheirer et al. ............. 370/480
6,370,244 B1 * 4/2002 Felder et al. ................ 379/283
6,418,209 B1 * 7/2002 Fujikura et al. ......... 379/142.08

* cited by examiner

*Primary Examiner*—Dang Ton
*Assistant Examiner*—Inder Pal Mehra
(74) *Attorney, Agent, or Firm*—William H. Bollman

(57) ABSTRACT

Apparatus and methods for adaptively, reliably, and accurately measuring the duration of an alerting or other signaling tone. A tone detector in accordance with the principles of the present invention accurately measures a duration of a tone burst (i.e., tone pulse) using a long frame length DFT and a short frame length DFT. Based on information obtained by the short frame length DFT, the long (i.e., standard) frame length DFT may be interrupted and reset to begin a new frame of data synchronized with the start of the next short frame corresponding to the processing by the short frame length DFT to minimize noise in the processing by the long frame length DFT and to greatly improve the resolution of the measurement of the duration of a particular tone to correspond to the lengths of the short frames used by the short frame length DFT. If desired, after a tone is initially detected, the frame length of the short frame length DFT can be iteratively reduced to increase a resolution of the measurement of a tone start time and a tone end time used to determine the duration of the detected tone burst.

18 Claims, 4 Drawing Sheets

ROBUST SIGNALING TONE DURATION MEASUREMENT

BACKGROUND OF THE INVENTION

1. Field of the Invention

This invention relates generally to the measurement of an alerting or other signaling tone. More particularly, it relates to a versatile method and apparatus capable of accurately measuring the duration of a tone burst, even in an environment including speech signals.

2. Background of Related Art

While the present invention relates to tone detection in general, it and its background are described with respect to a particular embodiment useful for detecting alerting tones relating to the reception of call related information, e.g., Caller ID information.

As is well known, Caller ID services permit a telephone customer to learn the identity of, or at least the originating telephone number of, a party seeking to place a telephone call to the customer. An older service referred to as Call-Waiting (CW) alerts a customer engaged in a telephone connection to another party, that a third party desires to place a telephone call to the customer. A newer service offered in telephone systems combines caller identification and call-waiting services, to not only alert a customer during a telephone connection that a third party desires to establish a connection, but also transmits to the CPE, caller identification information identifying the telephone number and/or name of the third party. This latter service is sometimes referred to as CIDCW (caller ID and call waiting) or Caller ID Type II.

Participation in a system with Caller ID and Call Waiting requires not only the presence of a central office capable of providing such service, but also CPE capable of receiving and transmitting the necessary control, acknowledgment and data signals. The general sequence of events during a telephone call in which the customer has Caller ID and Call Waiting service is as follows.

When a customer is currently engaged in a telephone conversation with a second party, a third party desiring to complete a telephone call with the customer may dial the customer's number. During the customer's conversation with the second party, the central office sends a subscriber alerting signal (SAS) alerting the customer that a third party desires to make a connection with the customer. The subscriber alerting signal is typically a single tone 400-hertz signal of about 500 milliseconds in duration, that is audible to the customer.

The central office follows the transmission of the subscriber alerting signal with the transmission of a CPE alerting signal (CAS). Similar to a dual tone multi-frequency signal, the CPE alerting signal has 2130 hertz and 2750 hertz components and optimally lasts for 80 milliseconds. Upon detection of the CPE alerting signal, the CPE sends a CAS acknowledgment signal (CAS ACK) to the central office, signaling to the central office that the CPE is ready to receive Caller ID information regarding the third party.

At the time the CPE transmits the CAS acknowledgment signal, it also disables the voice transmission transducer in the CPE. While the central office maintains the connection with the second party, it suppresses the CAS acknowledgment signal from the transmission sent to the second party. When the central office receives the CAS acknowledgment signal, it sends the caller identification information to the customer in the form of a frequency shift keyed (FSK) signal. The CPE can then display the caller identification information on a display unit as is known in the art. Full communication is established with the second party after receipt of the caller identification information. The customer, through the CPE can then decide how to handle the third party, such as placing the second party on hold and establishing the connection with the third party, for example.

Because of the proximity of the CPE alerting signal to voice frequencies transmitted and received in typical telephone systems, reliable detection of the CPE alerting signal can sometimes be a problem in conventional CPEs. For instance, conventional tone detectors used in this capacity sometimes experience "talkoff" episodes in which CPE alerting signals are falsely detected, and "talkdown" episodes in which actual CPE alerting signals are missed due to interference with speech. This erroneous operation is often the result of harmonic components of speech signals occurring in the frequency ranges of a tone signal such as the standard CPE alerting signal.

One conventional approach to eliminating talkoff and talkdown episodes during CPE alerting signal detection is described in U.S. Pat. No. 5,263,084 issued Nov. 16, 1993 to Chaput et al. The Chaput approach appears to be as follows. When the CPE receives the subscriber alerting signal, it mutes its handset for a predetermined period of time to reduce or eliminate background noise, in expectation of the occurrence of a CPE alerting signal conforming to known standards. The muting interval must be chosen to be of sufficient duration to reliably allow silence for CPE alerting signals of a given tolerance (i.e., beginning time, duration). Unfortunately, this technique requires a prior knowledge of the occurrence of an incoming tone signal. Moreover, the muting interval is typically long enough to be noticed by and cause an annoyance to customers engaged in a telephone conversation.

A different conventional approach employs the use of brute-force digital signal processing (DSP) methods, such as the use of fast Fourier transforms (FFTs), to continuously analyze each frame of a digitized signal for the presence of any/all expected tones.

Many people have made telephone calls, enjoying the convenience of communications using a telephone or other customer premises equipment. Moreover, everyone has heard some type of alerting tone, call progress tone (CPT) or other signaling tone from a central office, be it a busy tone, a dial tone, or other single or dual frequency tone used to signal customer premises equipment or a central office over a telephone line.

Generally, alerting or other signaling tones are either continuous, periodic, intermittent, or single pulse only. The duration of any particular tone pulse may be very short, e.g., 40 milliseconds (mS) or less. Generally, a minimum length of a particular tone pulse is conventionally established to provide a conventional tone detection algorithm sufficient time to detect the presence of the tone.

FIG. 4 shows a conventional tone detector 902 adapted to detect the presence of a particular tone (i.e., a particular alerting or other signaling tone) in an input signal typically received over a telephone line, and output either a "tone detected" or a "tone not detected" signal. Many tone detectors contain a plurality of algorithms or parameters to accommodate the detection of a plurality of expected alerting tone or other tone signals. Some signaling tones require detection of more than one frequency component, e.g., Dual Tone Multiple Frequency (DTMF) signals.

Tone detectors (e.g., DTMF dialer and call progress tone detectors) are common in most customer premises equipment. Early customer premises equipment included analog filters for detecting a tone, but more recent customer premises equipment includes a processor with digital tone detection software. Digital tone detectors usually include an algorithm implementing a discrete Fourier transform (DFT).

A DFT processes digital samples of the input signal on a frame-by-frame basis. The DFT processes each sample frame of a given length to detect the presence of a particular frequency component in the input signal to a resolution corresponding to the length of the data frame. If a particular frequency component above a predetermined energy threshold is detected in the processed frame having the proper duration, then a "tone detected" or similar signal is output.

FIG. 5 shows an exemplary sampling and processing of an input signal on a frame-by-frame basis through a DFT.

In particular, a signal including a tone pulse 1002 shown in waveform (a) of FIG. 5 is input to a DFT adapted to detect the presence of the tone pulse 1002. In a worst case scenario, the tone pulse 1002 may be split fairly evenly between separate frames 907, 909 for processing by the DFT, as represented by the positioning of a standard DFT frame signal 911 shown in waveform (b) of FIG. 5 with respect to the timing of the tone pulse 1002 in the input signal. Because the tone pulse 1002 may be split between frames 907, 909 of the DFT, the DFT must be capable of detecting the tone pulse 1002 in any one frame using a shorter duration (e.g., half) of the tone pulse 1002 than is available in the input signal.

DFTs with short data frames have wide main lobes and thus include a significant amount of noise along with the desired signal, while longer data frames tend to be better at noise reduction but decrease the resolution with which a duration of a tone can be detected. Conventionally, a balance is reached between the desirous and undesirous characteristics of short and long DFT data frames in view of the particular application, and a frame length for DFT processing is chosen. Longer DFTs require more memory (e.g., ROM memory), and typically take longer to compute.

Alternatively, overlapping of frames has been implemented to increase an effective resolution, but adds significant complexity to a system design.

Accordingly, some robustness may be lost in conventional DFTs, e.g., due to the selected length of the DFT data frame, and/or due to the inevitable asynchronicity between the tone pulse 1002 and the frame boundaries of the conventional DFT. However, in many conventional applications this is not a problem, e.g., because the tone pulses are detected in relatively noiseless environments. In such a situation, a tone can be detected relatively quickly with good confidence.

Typically, there was little reason to measure the duration of a tone pulse to any high degree of accuracy. As shown in the example of FIG. 5, measurement of the duration of the tone pulse 1002 using conventional techniques has at best the resolution of the DFT framing. For instance, the presence of the tone pulse 1002 may be output by the DFT at the conclusion of frames 907, 909, and will not be cleared until a subsequent frame 917, which is significantly longer than the actual duration of the tone pulse 1002 as shown in FIG. 5. Accordingly, the measured duration of the tone burst 1002 using conventional tone detectors found in most customer premises equipment or central offices may be fairly inaccurate with respect to the actual duration of the tone pulse 1002.

Most conventional tone detectors detect the presence of tones when there is no speech on the telephone line, and thus most tone detectors need not be too robust to provide reliable results. Thus, short tones (i.e., tones having a minimum duration of, e.g., 40 mS) can be used for signaling. Moreover, in such systems, tone frequencies were not mixed with voice signals. More recently, it has become necessary to detect alerting and/or other tones in the presence of voice signals on a telephone line, and to measure their frequency with a high degree of accuracy.

FIG. 6 shows the approximate long-term average spectral energy density for continuous speech, showing that high relative spectral energy is present in near-end speech, which is in the same general range as many signaling tones used by central offices. Thus, the presence of speech together with an alerting or other tone may cause noise in the particular spectral regions being measured for the presence of a particular alerting or other signaling tone.

For instance, Call Subscriber Services such as Caller ID/Call Waiting (CIDCW). Caller ID/Call Waiting is a Type II Caller ID service allowing the transmission of call related information such as a telephone number and/or household or business name to a called party regarding a third party caller to an established telephone call between the called party and someone else. Robust tone detectors are necessary to avoid the possibility of errors such as talkoff (false tone detects) and/or talkdowns (missed tone detects).

It is estimated that for every 10 mS of increased accuracy in the measured duration of a tone pulse, talkoff errors decrease by a factor of three (3). However, as described herein above, conventional tone detectors are generally limited in the accuracy of tone pulse measurement to the resolution of the DFT frame length.

Accordingly, there is a need for apparatus and techniques to accurately and efficiently measure the duration of tone bursts to increase the robustness of tone detectors, particularly with the increase in the need to detect alerting or other signaling tones on a telephone line including speech signals or other distracting and/or distorting signals, e.g., as in Call Subscriber Services such as CIDCW.

SUMMARY OF THE INVENTION

In accordance with the principles of the present invention, apparatus for measuring a duration of a tone burst in an input signal comprises a long frame length discrete Fourier transform adapted to process long DFT data frames corresponding to the input signal. A short frame length discrete Fourier transform is adapted to process short DFT data frames corresponding to the input signal. The short DFT data frames are shorter than the long DFT data frames. The short frame length discrete Fourier transform interrupts a process cycle of the long frame length discrete Fourier transform corresponding to a long DFT data frame when a tone is initially detected by the short frame length discrete Fourier transform.

A method of detecting a tone burst in an input signal in accordance with the principles of the present invention comprises firstly processing data frames corresponding to the input signal having a long length to detect a substantial presence of a particular frequency. The data frames are also secondly processed using data frames having a short length to detect a substantial presence of the particular frequency. The step of firstly processing is halted before a current long length data frame has been fully processed if a corresponding short length data frame is detected to not include the substantial presence of the particular frequency.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention recognizes the performance versus cost limitations of current customer premises equipment (CPE), e.g., equipment capable of operation in a telephone system with combined call-waiting and caller identification (Caller ID) services.

Moreover, the present invention provides apparatus and methods for adaptively, reliably, and accurately measuring the duration of an alerting or other signaling tone. An embodiment of a tone detector is described which is capable of measuring the duration of a tone burst (i.e., tone pulse) with a high degree of accuracy.

In accordance with the present invention, a tone detector uses both a long frame DFT and a short frame DFT working cooperatively to provide the advantages of each in the measurement of the duration of a particular alerting or other signaling tone. Based on information obtained by the short frame length DFT, the long (i.e., standard) frame length DFT may be interrupted and reset to begin a new frame of data synchronized with the start of the next short frame corresponding to the processing by the short frame length DFT to minimize noise in the processing by the long frame length DFT and to greatly improve the resolution of the measurement of the duration of a particular tone to correspond to the lengths of the short frames used by the short frame length DFT. If desired, after a tone is initially detected, the frame length of the short frame length DFT can be iteratively reduced to increase a resolution of the measurement of a tone start time and a tone end time used to determine the duration of the detected tone burst.

The start point of the tone can be determined based on the time of the first short DFT data frame to include the detected tone, and the stop point can be determined based on the time of the last short DFT data frame to include the detected tone.

Thus, the start and stop times of a tone burst relating to a particular call progress or other signaling tone can be measured more accurately with respect to a resolution provided by the short frame length DFT, while more efficient and noise-rejecting operation of the DFT can be provided using a longer frame DFT.

Figure 1:
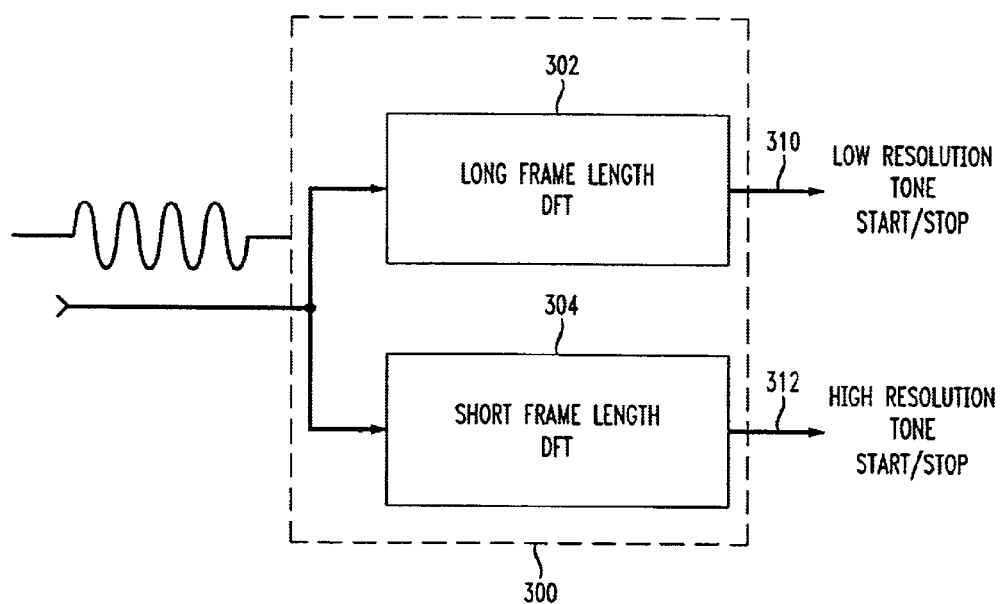
FIG. 1 shows a general block diagram of a tone detector including a first discrete Fourier transform (DFT) filter utilizing standard or conventional length DFT frames, and a second DFT utilizing shorter length DFT frames and a data buffer, to allow accurate measurement to a desired tolerance of the duration of a particular tone burst (i.e., tone pulse) contained in an input signal, even in the presence of speech or other signals, constructed in accordance with another aspect of the present invention.

FIG. 1 shows a general block diagram of a tone detector including a first discrete Fourier transform (DFT) 302 utilizing standard or conventional (i.e., long) length DFT frames, and a second DFT 304 utilizing shorter length DFT frames. The short frame length DFT 304 allows accurate measurement of the duration of a particular tone burst contained in an input signal to a desired tolerance, while the long frame length DFT 302 provides an analysis and detection of the tone having a high noise rejection capability, even in the presence of speech or other signals.

In particular, in FIG. 1, a long frame length DFT 302 and a short frame length DFT 304 are combined in a tone detector. Both the long frame length DFT 302 and the short frame length DFT 304 receive the digital samples of the input signal including (or not including) a particular tone of interest, only in differing frame lengths.

In FIG. 1, the long frame length DFT 302 and the short frame length DFT 304 substantially simultaneously process the input data using different length frames (i.e., different numbers of samples), but initially starting at the same point. The short frame length DFT 304 will conclude its measurement before the long frame length DFT 302. If the short frame length DFT 304 detects the presence of a particular tone above a threshold energy level, the long frame length DFT 302 will be allowed to continue its processing until it arrives at the end of its corresponding long length data frame. Information from the short frame length DFT 304 can be utilized to calculate an accurate duration of a detected pulse to within a resolution of the short data frame, while the output of the long frame length DFT 302 can be used to provide accurate, noise-rejected frequency detection information.

Preferably, the resolution provided by the short frame length DFT 304 will be selected based upon the needs of the particular application.

The long frame length DFT 302 and short frame length DFT 304 each perform a discrete Fourier transform on each input frame of data. In the disclosed embodiment, the discrete Fourier transform implements a Goertzel Algorithm using appropriate hardware and/or software to perform a discrete Fourier transformation of the composite input signal, typically including voice signals. The resulting transformation signal comprises information relating to a plurality of frequency-domain bins (called "Goertzels" in the present description).

Rather than a fast Fourier transform as in typical conventional tone detectors, the present invention uses a Goertzel Algorithm to perform a discrete Fourier transform on an input signal, e.g., on a signal from a telephone line. Goertzel Algorithms are described in many references, including, for example, Alan V. Oppenhelm and Ronald W. Schafer, (Englewood Cliffs, N.J.: Prentice-Hall, 1989), 585–87.

Figure 2:
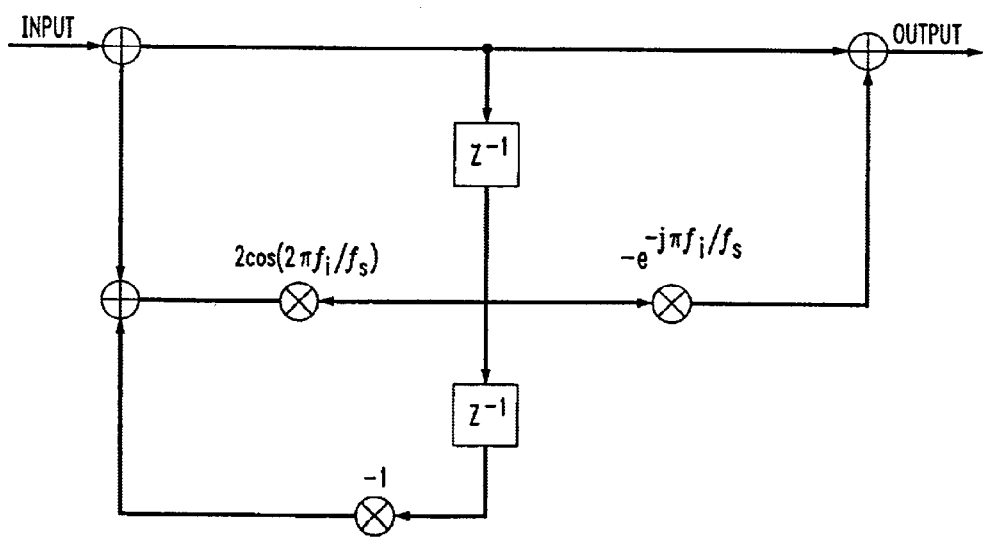
FIG. 2 shows an exemplary second order recursive infinite impulse response filter suitable for implementing a Goertzel algorithm for detection of tones, in accordance with the principles of the present invention.

The Goertzel Algorithm is defined by the following equation:

$$H_{fi}(z) = \frac{1 - e f_s z^{-1}}{1 - 2\cos(2\pi f_i / f_s)z^{-1} + z^{-2}}$$

where $f_i$ is the frequency of interest and $f_s$ is the sampling frequency. Those skilled in the art of digital signal processing will recognize that a second order recursive infinite impulse response filter, such as the one in FIG. 2, can be used for discrete Fourier transformation of signals with the Goertzel Algorithm.

Figure 3:
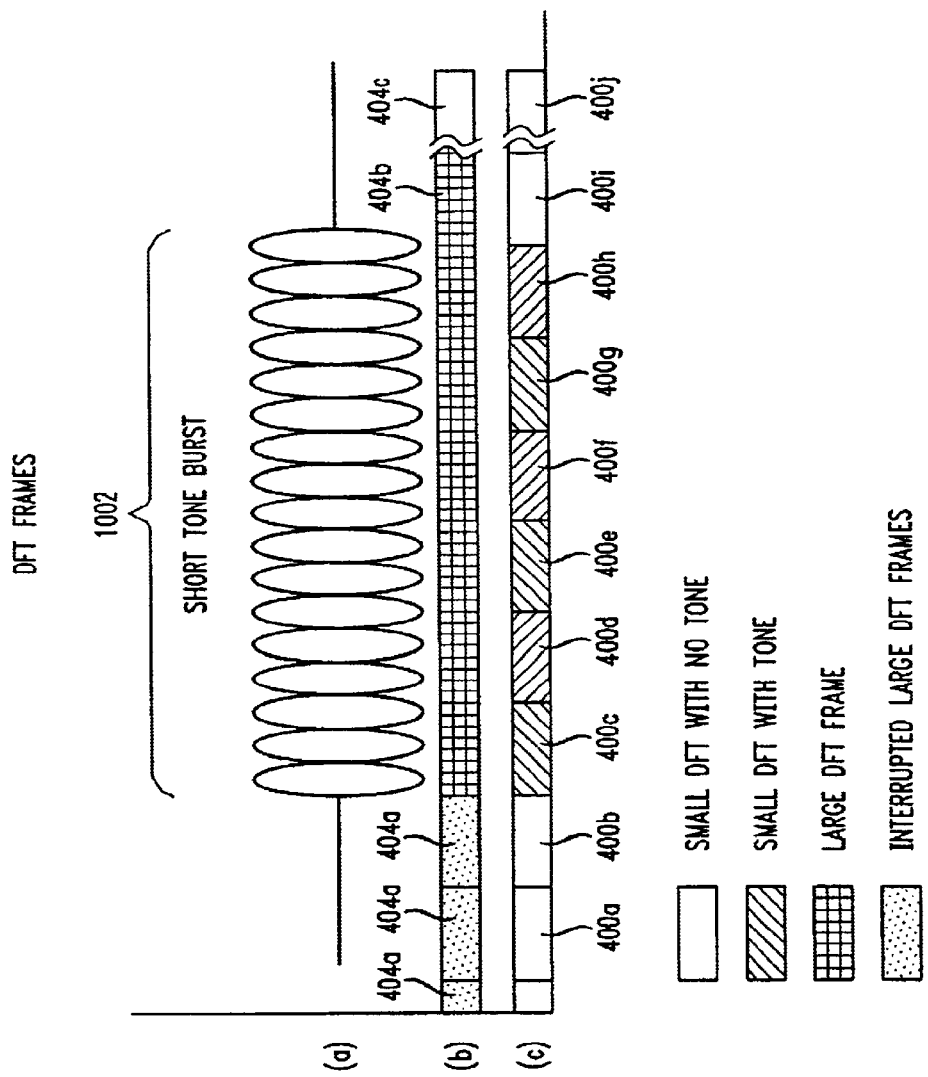
FIG. 3 is a timing diagram showing waveforms comparing relative lengths of exemplary DFT frame lengths with respect to the tone pulse contained in an input signal relating to the DFT shown in FIG. 1.
Figure 4:
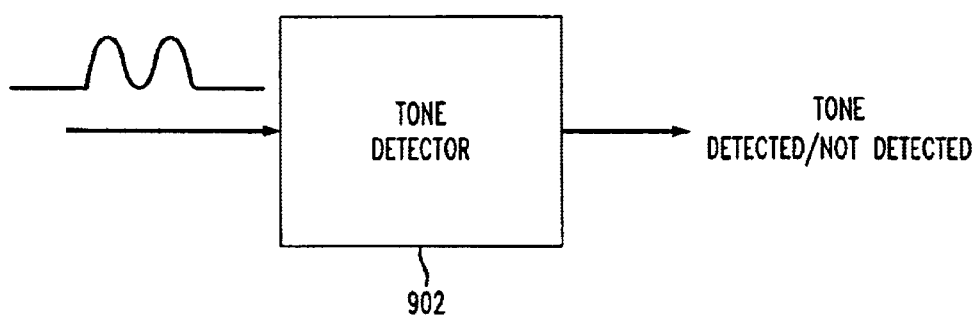
FIG. 4 shows a conventional tone detector which detects the presence of a particular tone frequency in an input signal, e.g., a particular call progress or other signaling tone, and output either a "tone detected" or a "tone not detected" signal with respect to an expected tone.
Figure 5:
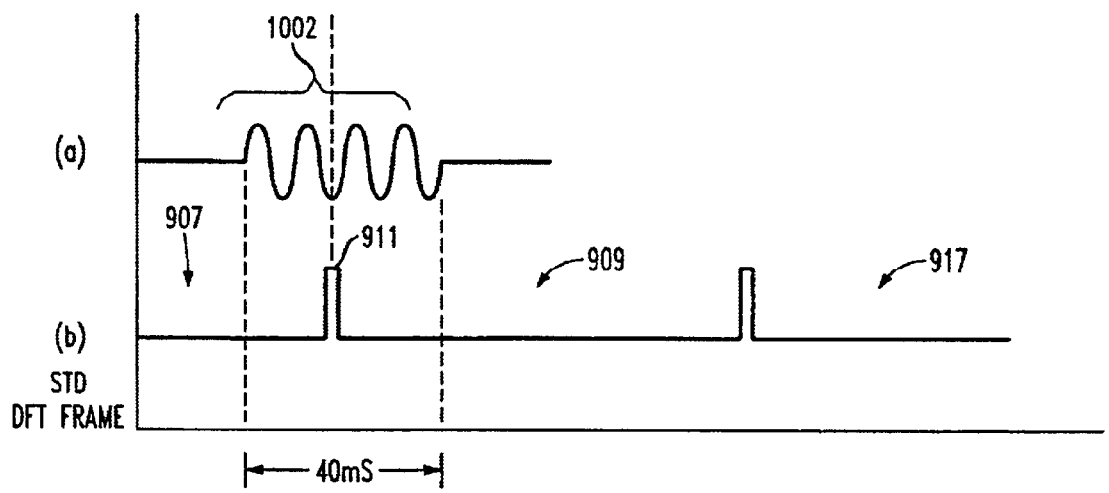
FIG. 5 shows conventional sampling and processing of an input signal on a frame-by-frame basis through a conventional DFT.
Figure 6:
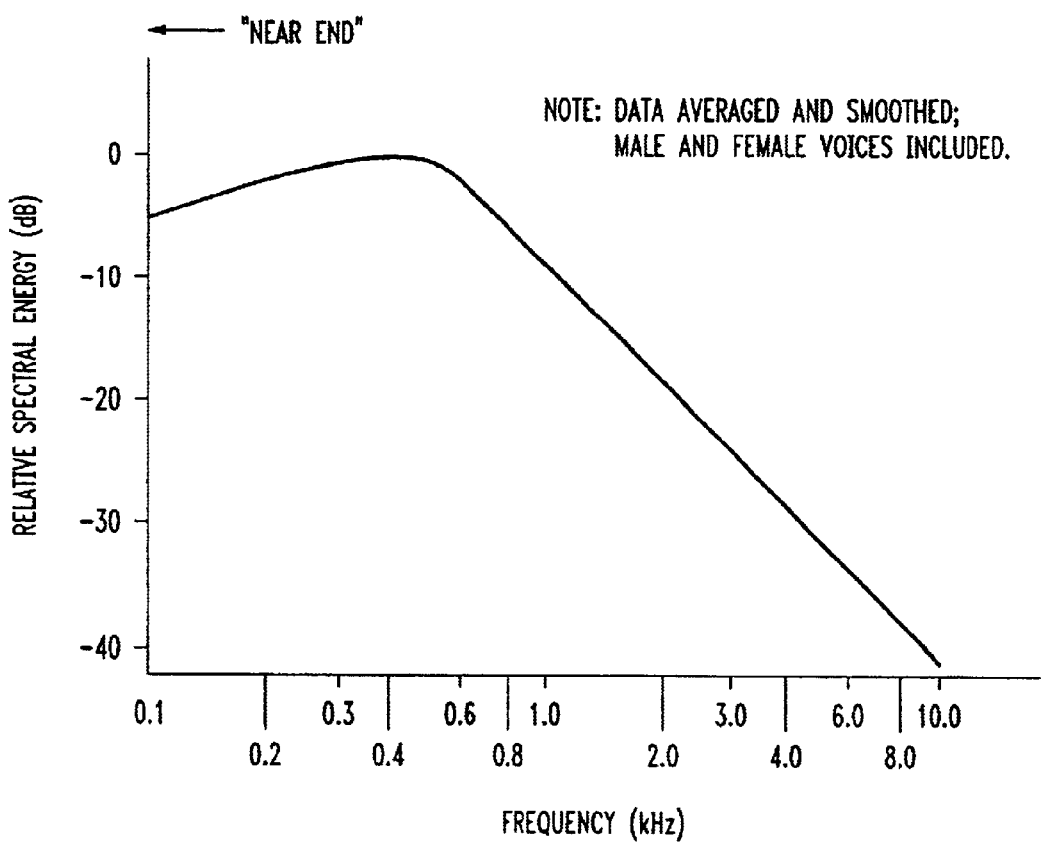
FIG. 6 shows the conventionally known approximate long-term average spectral energy density for continuous speech, showing that high relative spectral energy is present in near-end speech, which is in the same general range as many call progress and other signaling tones used by customer premises equipment and/or central offices.

FIG. 3 is a timing diagram for showing the basis for the technique by comparing exemplary DFT frame lengths of the long frame length DFT 302 (waveform (b) in FIG. 3) and the short frame length DFT 304 (waveform (c) of FIG. 3) with respect to the input signal (waveform (a) of FIG. 3) including a tone burst or pulse.

In particular, waveform (a) of FIG. 3 shows a short tone burst 1002 contained in an input signal.

Waveform (b) of FIG. 3 shows individual long length DFT frames 404*a*–404*c*. The long length DFT frames 404*a*–404*c* shown in waveform (b) of FIG. 3 relate to the processing by the long frame length DFT 302.

As shown in the given example, some of the long frames 404*a* and 404*c* are interrupted or cut short, and thus a proper energy level is not output by the long frame length DFT 302 (FIG. 1) based on the results of processing those interrupted long data frames 404*a*, 404*c*. In contrast, the uninterrupted long DFT data frame 404*b* is allowed to conclude its processing because of the detection of the tone burst 1002 in the first and subsequent short length DFT data frames (waveform (c) in FIG. 3) by the short frame length DFT 304 (FIG. 1).

Waveform (c) of FIG. 3 shows individual short frames 400*a*–400*j* relating to the processing by the short frame length DFT 304 shown in FIG. 1. As shown in the example of FIG. 3, short DFT data frames 400*c* to 400*h* result in a detection of the tone burst 1002, while the other short DFT data frames 400*a*, 400*b*, 400*i*, 400*j* do not result in a detection of the tone burst 1002.

A start point of the tone can be determined based on the initial short DFT frame 400*c* to detect the tone burst 1002, and an end point of the tone can be determined based on the last contiguous short DFT frame 400*h* to detect the tone burst 1002. The duration of the tone burst 1002 can be determined by a simple multiplication of the number of contiguous short DFT frames to detect the tone burst times the short frame length.

Thus, the duration of the tone burst can be determined to a tolerance based on the length of the short DFT frames. In certain applications requiring high accuracy, shorter short DFT frames can be implemented. Conversely, in applications having minimal requirements, longer short DFT frames can be implemented. In any event, the short DFT frames used by the short frame length DFT 304 are preferably shorter than the long DFT frames used by the long frame length DFT 302.

To adaptively increase the accuracy of the measurement of the duration of a tone burst, the short frame length DFT 304 may be implemented to utilize an adjustable data frame length. Thus, after a tone burst is initially detected in a first short length DFT frame, the long frame length DFT 302 can be allowed to conclude processing on its current long length DFT data frame, and the frame length used by the short frame length DFT 304 can be reduced to provide additional accuracy at least with respect to determining an end point of the tone.

The tone detector 300 may be adapted to continuously monitor an incoming signal, e.g., from a telephone line, to determine the presence of a desired frequency or pair of frequencies relating to call progress signaling.

In the disclosed embodiment, a standard length DFT data frame is approximately 4 milliseconds in length, while the short DFT data frames may be significantly shorter than 4 milliseconds, e.g., less than 1 millisecond. Preferably, but not necessarily, the length of the standard length DFT data frame will be an integer multiple of the length of the short DFT data frame. Of course, shorter or longer DFT data frames are within the principles of the present invention.

Accordingly, an improved and novel tone detector using digital signal processing has been described. Certainly, variations and modifications of the present invention are possible, given the above description. However, all variations and modifications which are obvious to those skilled in the art to which the present invention pertains are considered to be within the scope of the protection granted by this Letters patent.

For example, the false tone detect suppression provided by a tone detector constructed in accordance with the principles of the present invention is not limited to the detection of CAS tones, nor to the detection of Caller ID information, nor even to the exclusive use in telephonic equipment at all.

Tone detectors constructed in accordance with the principles of the present invention may be integrated within the software of a controller or other suitable processor of customer premises equipment (or central office equipment), or may be separate therefrom. The tone detectors can be implemented in standard general purpose processors with relatively low resources. Suitable processors include, e.g., a microprocessor, microcontroller, or digital signal processor (DSP).

Tone detectors in accordance with the principles of the present invention have application in many customer premises equipment and/or central office telephone equipment, including but not limited to telephone answering devices, speakerphones, CallerID or similar call related information receiver/detector units, and/or cordless telephones.

While the invention has been described with reference to the exemplary embodiments thereof, those skilled in the art will be able to make various modifications to the described embodiments of the invention without departing from the true spirit and scope of the invention.

What is claimed is:

1. Apparatus for measuring a duration of a tone burst in an input signal, comprising:

a long frame length discrete Fourier transform adapted to process long DFT data frames corresponding to said input signal; and a short frame length discrete Fourier transform adapted to process short DFT data frames corresponding to said input signal, said short DFT data frames being shorter than said long DFT data frames;

wherein said short frame length discrete Fourier transform interrupts a process cycle of said long frame length discrete Fourier transform corresponding to a long DFT data frame when a tone is initially detected by said short frame length discrete Fourier transform; and whereby a duration of said tone burst is determined based on a number of short length data frames in which said tone burst is detected.

2. The apparatus for measuring a duration of a tone burst in an input signal according to claim 1, wherein:

a duration of a detected tone burst is based on an output of said short frame length discrete Fourier transform.

3. The apparatus for measuring a duration of a tone burst in an input signal according to claim 2, wherein:

said duration of said detected tone burst is based on a number of contiguous individual short DFT data frames in which said tone is detected by said short frame length discrete Fourier transform.

4. The apparatus for measuring a duration of a tone burst in an input signal according to claim 1, wherein:

said short frame length is adjustable.

5. The apparatus for measuring a duration of a tone burst in an input signal according to claim 1, wherein:

said input signal includes speech signals.

6. The apparatus for measuring a duration of a tone burst in an input signal according to claim 1, wherein:

said short frame length discrete Fourier transform is further adapted to allow adjustment of an accuracy of said measured duration of said tone burst by adjusting a length of said short DFT data frames processed by said short length discrete Fourier transform.

7. The apparatus for measuring a duration of a tone burst in an input signal according to claim 6, wherein:

said accuracy is increased by increasing said length of said short DFT data frame processed by said short frame length discrete Fourier transform.

8. A method of detecting a tone burst in an input signal, comprising:

firstly processing data frames corresponding to said input signal having a long length to detect a substantial presence of a particular frequency;

secondly processing data frames corresponding to said input signal having a short length to detect a substantial presence of said particular frequency; and determining a duration of said tone burst based on a number of short length data frames in which said tone is detected;

wherein said step of firstly processing is halted before a current long length data frame has been fully processed if a corresponding short length data frame is detected to not include said substantial presence of said particular frequency.

9. The method of detecting a tone burst in an input signal in accordance with claim 8, wherein:

said short length data frame and said long length data frame start at a substantially same point.

10. The method of detecting a tone burst in an input signal in accordance with claim 8, wherein:

said steps of firstly processing and secondly processing each include transformation.

11. The method of detecting a tone burst in an input signal in accordance with claim 10, wherein:

said transformation includes a discrete Fourier transformation.

12. The method of detecting a tone burst in an input signal in accordance with claim 11, wherein:

said steps of firstly processing and secondly processing are performed substantially simultaneously.

13. The method of detecting a tone burst in an input signal in accordance with claim 8, wherein:

said steps of firstly processing and secondly processing are performed substantially simultaneously.

14. Apparatus for detecting a tone burst in an input signal, comprising:

means for firstly processing data frames corresponding to said input signal having a long length to detect a substantial presence of a particular frequency;

means for secondly processing data frames corresponding to said input signal having a short length to detect a substantial presence of said particular frequency; and means for determining a duration of said tone burst based on a number of short length data frames in which said tone is detected;

wherein said means for firstly processing is halted before a current long length data frame has been fully processed if a corresponding short length data frame is detected to not include said substantial presence of said particular frequency.

15. The apparatus for detecting a tone burst in an input signal in accordance with claim 14, wherein:

said short length data frame and said long length data frame start at a substantially same point.

16. The apparatus for detecting a tone burst in an input signal in accordance with claim 14, wherein:

said means for firstly processing and said means for secondly processing each include transformation means.

17. The apparatus for detecting a tone burst in an input signal in accordance with claim 16, wherein:

said transformation includes a discrete Fourier transformation.

18. The apparatus for detecting a tone burst in an input signal in accordance with claim 14, wherein:

said means for firstly processing and said means for secondly processing each operate substantially simultaneously.

* * * * *